March 19, 1957 L. W. POLLOCK 2,785,964
PROCESS, APPARATUS AND SYSTEM FOR PRODUCING, AGGLOMERATING
AND COLLECTING CARBON BLACK
Filed Aug. 17, 1953 4 Sheets-Sheet 1

INVENTOR.
L. W. Pollock
BY
ATTORNEYS

March 19, 1957  L. W. POLLOCK  2,785,964
PROCESS, APPARATUS AND SYSTEM FOR PRODUCING, AGGLOMERATING AND COLLECTING CARBON BLACK
Filed Aug. 17, 1953  4 Sheets-Sheet 4
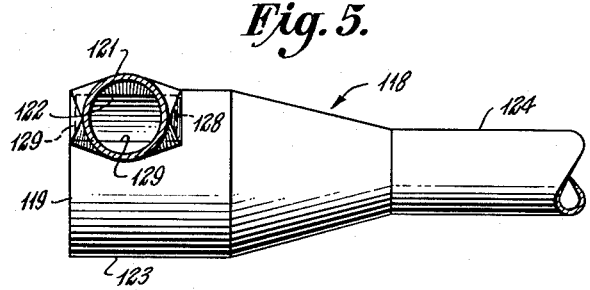
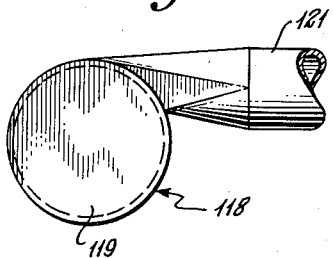
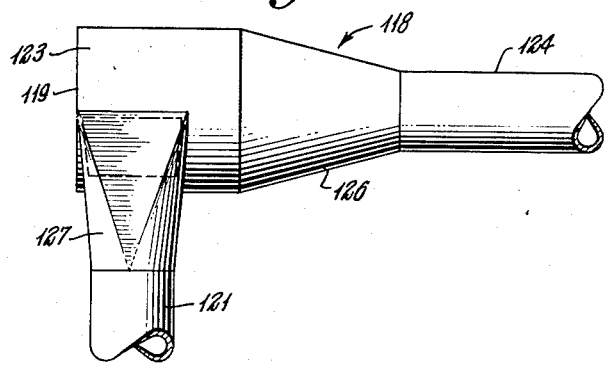
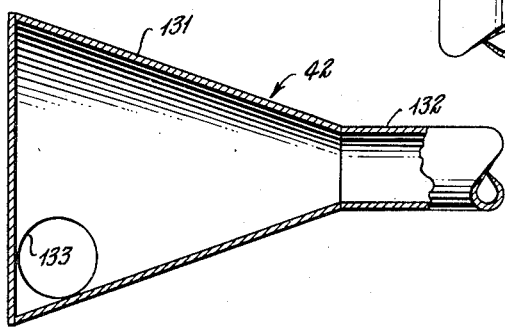
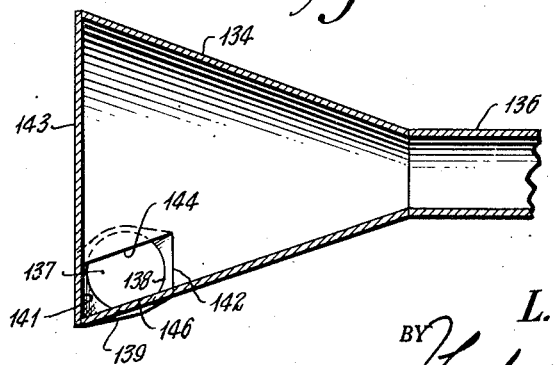
INVENTOR.
L. W. Pollock
BY Hudson & Young
ATTORNEYS United States Patent Office 2,785,964
Patented Mar. 19, 1957

2,785,964

PROCESS, APPARATUS, AND SYSTEM FOR PRODUCING, AGGLOMERATING, AND COLLECTING CARBON BLACK

Lyle W. Pollock, Bartlesville, Okla., assignor to Phillips Petroleum Company, a corporation of Delaware Application August 17, 1953, Serial No. 374,803

16 Claims. (Cl. 23—314)

This invention relates to processes, apparatus, and systems for producing, agglomerating and/or collecting carbon black. In one aspect, it relates to agglomerating carbon black particles in the effluent smoke coming from a carbon black producing furnace. In another aspect it relates to agglomerating carbon black particles in smoke by centrifugal force generated when the smoke is introduced tangentially into an enlarged vessel, or enlarged portion of a conduit.

In the prior art numerous systems have been devised for removing carbon black particles from the effluent gases from carbon black producing furnaces. Due to the very small size of the carbon black particles produced in such furnaces, their separation from the gaseous portion of said smoke is very difficult. The prior art has endeavored to remove these carbon black particles by a series of separation steps, each of which steps is progressively more difficult because the amount of carbon black remaining is rapidly decreasing, while a considerable portion of the carbon black particles have not yet become agglomerated and therefore pass through and fail to separate completely in the usual separation equipment.

The present invention operates on the principle that by subjecting such effluent smoke to one or more centrifugal agglomerating processes without any separation steps while the smoke is still in concentrated form, the carbon black particles will become agglomerated due to being forced in contact with each other, and when separation steps are applied later this latter separation of the agglomerated particles from the gases present by electrical precipitators, cyclone separators and/or mechanical filters, such as fabrics, is made much more complete and is otherwise improved.

One object of this invention is to simplify the equipment required to remove carbon black from the effluent gases from the carbon black reactor.

Another object is to cause the agglomeration of the carbon black as it emerges from the furnace to take advantage of the high concentration of the carbon black in the smoke at this point.

Another object is to provide suitable processes, apparatus and systems for the production, agglomeration and/or collection of carbon black.

Numerous other objects and advantages will be apparent to those skilled in the art upon reading the accompanying specification, claims and drawings.

In the drawings:

Figure 5 is an elevational view with parts in section of a second form of agglomerator which could be substituted for one or more of the agglomerators shown in Figure 1.

Figure 6 is a view similar to Figure 5 of the same apparatus rotated 90° about the longitudinal axis of pipe 124.

Figure 7 is an end view of the apparatus shown in Figure 5.

Figure 8 is an enlarged cross-sectional view of one of the agglomerators shown in Figure 1.

Figure 9 is a cross-sectional view of a third modified form of agglomerator which can be substituted for one or more of the agglomerators shown in Figure 1.

Figure 1:
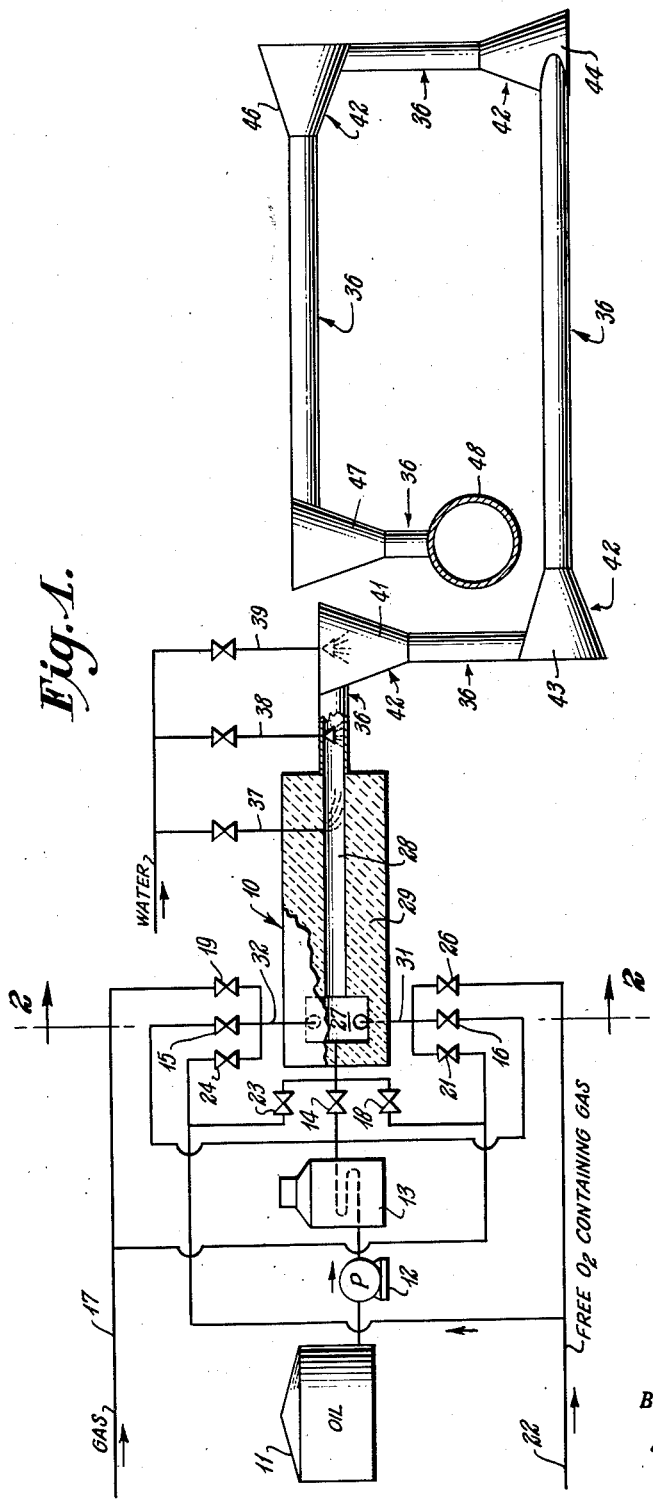
Figure 1 is an elevational view with parts broken away to show details of construction of an apparatus for producing and agglomerating carbon black embodying the present invention.
Figure 2:
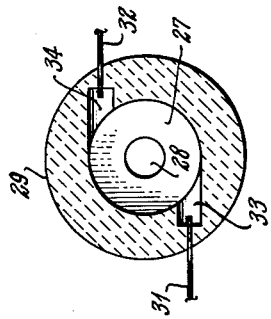
Figure 2 is a cross-sectional view of a portion of the furnace of Figure 1 taken along the lines 2—2 looking in the direction indicated.

In Figure 1, numeral 10 generally designates a carbon black furnace of any known type in which particles of carbon black are produced in the form of smoke by the pyrolysis and/or incomplete combustion of carbonaceous materials, generally liquid or gaseous hydrocarbons because of cheapness and availability. Such carbon black furnaces are described in many patents such as Ayers Reissue 22,886 of June 3, 1947; Krejci 2,375,795 of May 15, 1945; Krejci 2,564,700 of August 21, 1951; Lewis 1,669,618 of May 15, 1928; or Miller 1,807,321 of May 26, 1931. The carbon black particles can be formed by dehydrogenation in the presence of heat without oxidation, or there can be oxidation of the hydrogen in some molecules of the hydrocarbons insufficient to oxidize all the carbon therein. There are a large number of furnaces which produce carbon black smoke and any one of these furnaces can be employed with the present invention regardless of whether there is helical movement of gases in the furnace, or any other specific feature. Of course, all these processes obviously do not produce the same quality carbon black.

For purposes of illustration, furnace 10 most closely resembles Krejci 2,564,700 of August 21, 1951. Oil from tank 11 may be pumped by pump 12 into furnace 10 without heating, or it may be preheated in preheater 13 to vaporize the same, or merely heated enough to aid in its rapid vaporization on entering furnace 10. However, it may be sprayed as a liquid spray into furnace 10 if desired. As desired, the oil 11, either heated or not, may enter furnace 10 axially through valve 14 and/or tangentially through valves 15 and/or 16.

It is not necessary to use oil, however, as gas alone may be employed, or mixtures of gas and oil, the gas preferably being a hydrocarbon, or mixture of such hydrocarbons as methane, ethane, propane, butane and pentane. Gas 17 may enter furnace 10 axially through valve 18, and/or tangentially through valves 19 and 21. As the carbon black is being produced by incomplete combustion rather than by externally added heat 13 alone, a suitable amount of a free oxygen containing gas 22 may be added axially through valve 23 and/or tangentially through valves 24 and 26. Usually this free oxygen containing gas is air, but there are advantages to using oxygen alone, or oxygen with a gaseous diluent such as carbon monoxide, or dioxide, hydrogen, or mixtures of these, one source for such being gas from flue 77.

The furnace comprises an enlarged cylindrical chamber 27 and a reduced diameter cylindrical chamber 28, although a single diameter chamber is often sufficient for the production of certain types of carbon black, and chambers 27 and 28 are surrounded by a ceramic material 29. The reactive material comes into the furnace tangentially from valves 15, 16, 19, 21, 24 and 26 comes in through pipes 31 and 32 into tunnels 33 and 34 in the ceramic body 29 into the chambers 27 and 28, where the pyrolytic reaction takes place forming the carbon black as small particles suspended in a gas, known as smoke.

A conduit generally designated as 36 is connected to the outlet 28 of said carbon black furnace 10 to receive the effluent smoke therefrom, containing said carbon black particles and a water spray 37, 38 and/or 39 may be disposed in the outlet end of chamber 38, in conduit 36, or in the enlarged portion 41 of conduit 36, or in enlarged portions 42, 44, 46 or 47 (not shown) in a manner similar to 39 in 41. Said water spray is disposed and adapted to quench the smoke and reduce or terminate chemical reactions therein. However, some processes do not have any quench, but rely on indirect heat exchange cooling with the atmosphere or other cooling fluid. There are means generally designated as 42 in said conduit to agglomerate the carbon black particles in said smoke comprising a plurality of enlarged conical portions 41, 43, 44, 46 and 47 in said conduit 36. Said conduit 36 is formed to pass said smoke tangentially into the enlarged end of each of said conical portions 41, 43, 46 and 47, said smoke passing helically through said enlarged portion, out of the small end of said cone into a continuation of said conduit 36. In this manner, the carbon black particles are thrown outwardly by centrifugal force into agglomerating contact with each other.

The present invention recognizes that the use of just one of agglomerators 42 before the separation step is of commercial value, but it is found that the use of a plurality of them, for example, as shown in Figure 1, is even more effective. The most convenient mode of determining the number to use is to install one at each turn of pipe 36, but obviously it is not necessary to have one at each turn.

Figure 3:
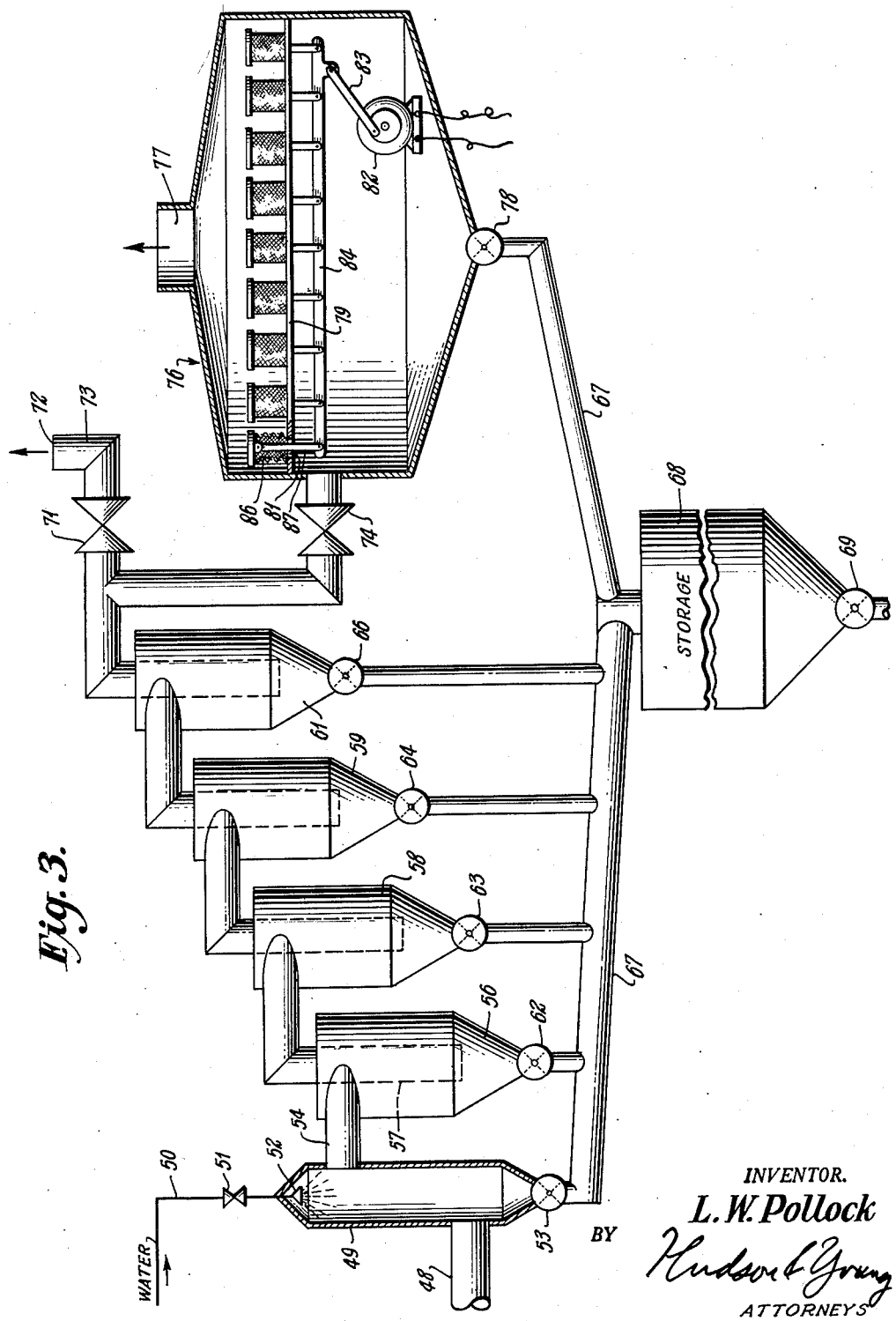
Figure 3 is an elevational view with parts in section to show details of construction of one form of carbon black collection system suitable to be employed in combination with the apparatus of Figure 1 to carry out the present invention.
Figure 4:
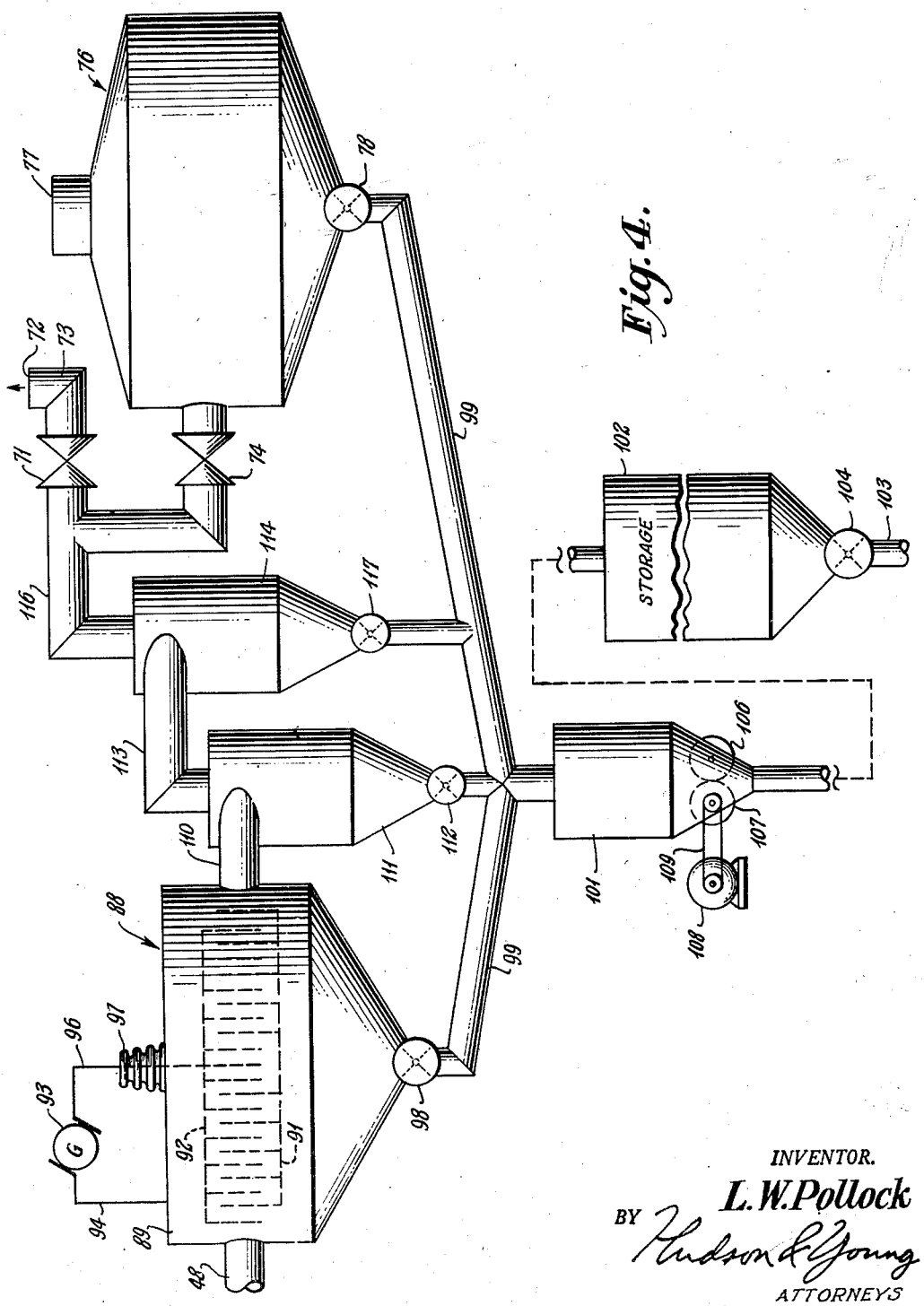
Figure 4 is a view similar to Figure 3 of a second suitable modified form of collection apparatus which can be used in combination with the apparatus of Figure 1 in carrying out the present invention.

Each of furnaces 10 (only one shown, but usually there are a number) discharges through a conduit 36 which may lead directly to the apparatus shown in Figures 3 and 4, but which preferably are manifolded in a manifold line 48.

In Figure 3 is shown a carbon black collection system connected to receive said smoke from conduit 36 through manifold 48. Said collection system may comprise in series a plurality of collection units. The smoke going to these collection units may enter pipe 54 directly through pipe 48 omitting chamber 49 (this system is not shown), but it preferably is cooled to a uniform temperature, summer or winter, in cooler 49 with water 50 regulated by valve 51 and sprayed in through spray head 52. The amount of water is generally regulated so that it will all evaporate in chamber 49. However, some carbon black may accumulate in the bottom of chamber 49, and if so, can be removed through star valve 53.

The carbon black smoke emerging from cooler 49 passes through pipe 54 tangentially into cyclone separator 56. Cyclone separator 56 is well known in the prior art and comprises an inlet pipe 54 tangential to the internal cylindrical surface of body 56 and having an axial gas withdrawal pipe 57 mounted axially in body 56. One cyclone separator will remove the major portion of the carbon black, but it is generally economical and desirable to have a plurality of cyclone separators 56, 58, 59 and 61 in series. While four are shown, it is often sufficient to employ one or two, depending on the load of carbon black in the gas and how much of the same it is desired to remove. The carbon black particles in smoke 48 substantially all fall to the bottom of the cyclone separators 56, 58, 59 and 61 where it may be removed through star valves 62, 63, 64 and 66 passing through a manifold 67 into storage tank 68 from which it may be removed through star valve 69 when desired.

If cyclone separators are all that are being employed in the collection system, the remaining gas may be vented through valve 71 out the end 72 of pipe 73 to the atmosphere. However, then there is often a visible amount of smoke still remaining, which may be objectionable, in which case it is preferred to close valve 71 and open valve 74 and pass the remaining smoke through a bag filter generally designated as 76, or some other mechanical filtering means known to the prior art (not shown) to the atmosphere at 77. As some carbon black is even collected in the bag filter 76, it is desirable to employ a star valve 78 in order to pass this carbon black through manifold 67 to storage at 68.

The bag filter 76 may have an outlet 77 which is separated from the inlet 74 by a partition 79 having holes 81 therein with bags 86 covering said holes and preventing the passage of carbon black particles through the diaphragm. The remaining gases escaping at 77 are generally white (due to steam), or substantially invisible, because substantially all the carbon black has been removed.

It is common in such bag filters as 76 to have an electrical motor 82 driving a pitman 83 secured to a master shaker bar 84.

As each one of the bags 86 has an individual shaker bar 87 pivoted to the top of bag 86, to diaphragm 79, and to bar 84, it is obvious that intermittent or constant rotation of motor 82 will shake carbon black out of bags 86 so that it may be removed by gravity through star valve 78. Many other refinements (not shown) may be added to such bag filters.

In Figure 4, conduit 48 leads to an electrical precipitator 88 which separates some of the carbon black by electrostatic attraction and repulsion. Electrical precipitator 88 comprises a case 89 having grounded electrodes 91 interposed with charged electrodes 92. Electrodes 91 and 92 are charged to opposite potentials by any suitable charging means, such as electrical generator 93, which is grounded to case 89 and electrode 91 through wire 94, whereas electrode 92 is brought to an opposite potential by wire 96 passing in through insulators 97. Insulator 97 may also serve as a support for electrode 92.

Some separation takes place in precipitator 88, especially when the agglomerators 42 of the present invention proceed the same, and the carbon black in the precipitator 88 that does separate passes out through star valve 98 into collection manifold 99, preferably through a micropulverizer 101 to storage tank 102 from which it may be drawn by conduit 103 through star valve 104 whenever needed. The micropulverizer is a grinding machine having grinding rollers 106 and 107 driven by motor 108 through belt 109, which crush gritty or lumpy agglomerated particles, as is well known in the prior art. The micropulverizer 101 is not essential to the present invention.

The effluent carbon black smoke from precipitator 88 passes through pipe 110 tangentially into a cyclone separator 111 similar to separator 56 of Figure 3, the carbon black from which the gaseous material has been substantially eliminated, passing out the bottom through valve 112 whereas the gaseous material passes tangentially through pipe 113 into a second cyclone separator 114 which in turn has a pipe 116 for gas and a star valve 117 for passing carbon black to manifold 99. As parts 71, 72, 73, 74 and 76 are the same as in Figure 3, they have not been described further.

In Figure 5 is shown an agglomerator generally designated as 118 comprising a round, generally cylindrical, vessel tapering inward along its axis from an enlarged base 119, said vessel being connected to an inlet conduit 121 entering tangentially into the inner surface 122 of the enlarged base portion 123 of said vessel. The term "round" is not limited to spherical shapes but covers all surfaces of revolution. An outlet 124 is shown axially connected to the small end of said vessel. Figures 5, 6 and 7 are views of the same agglomerator 118, which comprises a cylindrical portion 123, and a conical portion 126 tapering conically down to connect to said outlet conduit 124, while the inlet conduit 121 is tapered at 127 into a rectangle lying in the surface of said cylinder 123 and having two sides 128 and 129 lying in planes parallel to said base 119 and two sides 122 and 129 parallel to the axis of said cylinder. A rectangle lying in the surface of a cylinder has two sides arcuate in the third dimension, but is a rectangle in the surface of the cylinder.

In Figure 8, the enlarged vessel 131 is conical and is connected at its apex axially to a discharge conduit 132, while the inlet conduit 133 is cylindrical. This is an enlarged view of the same device 42 as employed in Figure 1.

In Figure 9, the enlarged vessel 134 is connected to an outlet conduit 136, and while 134 is conical, the inlet 137 is different than 133 as shown in Figure 8 in that the inlet conduit 138 is tapered into a rhomboid 139 lying in the surface of said cone and having two sides 141 and 142 parallel to the base 143 of the cone and two sides 144 and 146 parallel to a generating line of the cone at the line of tangency of said conduit. A rhomboid lying in the surface of a cone has all four sides arcuate in the third dimension.

Operation

In the operation of all of the figures, the effluent smoke coming from furnace 10, whether quenched by quenches 37, 38 and/or 39, or unquenched, enters tangentially into enlarged portion 41 where the carbon black particles are given a whirl as the gas expands, decreases in velocity, and goes into a mild spin, with an acceleration as it progresses through the tapering portion into the conduit 36. The spinning motion causes the carbon black particles to be concentrated near the surface of the conduit resulting in considerable agglomeration of the particles, especially as the smoke is concentrated. The agglomerating effect is enhanced by the more effective cooling of the carbon black when its average position is nearer to the surface of the conduit making up the air cooling system 36, 42. Another effect tending to enhance the cooling efficiency in enlarged portions 42 near the surface of the conduit resides in the evaporation of water droplets which have been transported by the smoke and deposited on the surface of the conduit by centrifugal force created by the tangential entry of the smoke into the conical section of the conduit. No separation of carbon black from gas takes place, only agglomeration.

The present process agglomerates the carbon black particles in agglomerators 42 while the concentration of carbon in the smoke is at a maximum, without excessive agglomeration which would lead to precipitation of the agglomerated particles, while the separation of the carbon black and the collection thereof is not accomplished by the agglomerators 42, but instead is done at a later time by the collection system shown in either Figures 3 or 4. The operation of cyclone separators 56, 58, 59, 61, 111 and 114, precipitator 88, and bag filters 76 is the same as in the prior art, except more efficient and more complete separation of carbon black from the gas is effected, so no detailed description of their operation is needed. In cyclone 56, the smoke emerges from pipe 54 tangentially into an enlarged cylindrical chamber, and due to centrifugal force, gravity, reversal of direction as the gas enters the lower end of exit 57, and other causes the major portion of the carbon black drops out of the gas and exits through valve 62. In precipitator 88 the particles take a charge from one electrode and some are then drawn in by and deposit on the oppositely charged electrode. In bag filter 76 the carbon black particles are too big to pass small openings in fabric 86.

It will be noted in Figure 1 that the direction of rotation of the smoke in each of pipes 36 is such that as it enters each agglomerator 42, the motion of the smoke at the surface of the agglomerator 42 is toward the outlet end of the agglomerator. While this gives the best results, valuable results can also be obtained when the rotation is in the opposite direction.

While specific embodiments of the invention have been shown and described for purposes of illustration, obviously the invention is not limited thereto.

Having described my invention, I claim:

1. The process of agglomerating carbon black particles in the effluent smoke coming from a carbon black producing furnace and separating said carbon black particles from substantially all of the gaseous portion of said smoke, comprising the steps of consecutively passing said effluent smoke tangentially into a series of circular cross section enlarged zones each having a single axial outlet thereby whirling said carbon particles about and causing them to move outward by centrifugal force into contact with each other in each of said series of zones to agglomerate the same a plurality of times, all without separating said carbon black particles from the remainder of said smoke, and further agglomerating said particles by passing said smoke from said outlet containing the same between oppositely charged electrodes, and then separating said particles from substantially all of said gaseous portion of said smoke by cyclone separation and filtering the remaining smoke through a mechanical fabric filter.

2. The process of agglomerating carbon black particles in the effluent smoke coming from a carbon black producing furnace and separating said carbon black particles from substantially all of the gaseous portion of said smoke, comprising the steps of passing said effluent smoke tangentially into an enlarged zone of circular cross section having a single axial outlet thereby whirling said carbon particles about and causing them to move outward by centrifugal force into contact with each other to agglomerate the same, all without separating said carbon black particles from the remainder of said smoke, and further agglomerating said particles by passing said smoke containing the same from said outlet between oppositely charged electrodes, and then separating said particles from substantially all of said gaseous portion of said smoke by cyclone separation and filtering the remaining smoke through a mechanical filter.

3. The process of agglomerating carbon black particles in the effluent smoke coming from a carbon black producing furnace and separating said carbon black particles from substantially all of the gaseous portion of said smoke, comprising the steps of passing said effluent smoke tangentially into an enlarged zone of circular cross section having a single axial outlet thereby whirling said carbon particles about and causing them to move outward by centrifugal force into contact with each other to agglomerate the same, all without separating said carbon black particles from the remainder of said smoke, and then separating said particles from substantially all of said gaseous portion of said smoke from said outlet by cyclone separation and filtering the remaining smoke through a mechanical fabric filter.

4. The process of agglomerating carbon black particles in the effluent smoke coming from a carbon black producing furnace and separating said carbon black particles from substantially all of the gaseous portion of said smoke, comprising the steps of passing said effluent smoke tangentially into an enlarged zone of circular cross section having a single axial outlet thereby whirling said carbon particles about and causing them to move outward by centrifugal force into contact with each other to agglomerate the same, all without separating said carbon black particles from the remainder of said smoke, and further agglomerating said particles by passing said smoke containing the same from said outlet between oppositely charged electrodes, and then separating said particles from substantially all of said gaseous portion of said smoke by cyclone separation.

5. The process of agglomerating carbon black particles in the effluent smoke coming from a carbon black producing furnace and separating said carbon black particles from substantially all of the gaseous portion of said smoke, comprising the steps of passing said effluent smoke tangentially into an enlarged zone of circular cross section having a single axial outlet thereby whirling said carbon particles about and causing them to move outward by centrifugal force into contact with each other to agglomerate the same, all without separating said carbon black particles from the remainder of said smoke, and then separating said particles from substantially all of said gaseous portion of said smoke from said outlet by cyclone separation.

6. The process of agglomerating carbon black particles in the effluent smoke coming from a carbon black producing furnace, comprising the steps of passing said effluent smoke tangentially into an enlarged zone of circular cross section having a single axial outlet thereby whirling said carbon particles about and causing them to move outward by centrifugal force into contact with each other to agglomerate the same, all without separating said carbon black particles from the remainder of said smoke, and further agglomerating said particles by passing said smoke containing the same from said outlet between oppositely charged electrodes.

7. A carbon black production, agglomeration and collection system comprising in combination a carbon black furnace, a conduit disposed and adapted to be connected to the outlet of said carbon black furnace to receive carbon black particle containing effluent smoke therefrom, a water spray disposed and adapted to discharge into said conduit to quench the effluent smoke therein, and means in said conduit to agglomerate the carbon black particles in said smoke comprising a plurality of conical enlarged portions in said conduit, said enlarged portions each having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke, and a carbon black collection system connected to receive said smoke from said conduit comprising in series a plurality of collection units comprising an electrical precipitator, at least one cyclone separator, a bag filter, and means in each unit to collect said carbon black substantially free from gas at the bottom of said unit and means to pass the remaining smoke out of said unit.

8. A carbon black agglomeration and collection system comprising in combination a conduit disposed and adapted to be connected to the outlet of a carbon black furnace to receive carbon black particle containing effluent smoke therefrom, and means in said conduit to agglomerate the carbon black particles in said smoke comprising a plurality of conical enlarged portions in said conduit, said enlarged portions each having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke, and a carbon black collection system connected to receive said smoke from said conduit comprising in series a plurality of collection units comprising at least one cyclone separator and means in each unit to collect said carbon black substantially free from gas at the bottom of said unit and means to pass the remaining smoke out of said unit.

9. A carbon black production and agglomeration system comprising in combination a carbon black furnace, a conduit disposed and adapted to be connected to the outlet of said carbon black furnace to receive carbon black particle containing effluent smoke therefrom, a water spray disposed and adapted to discharge into said conduit to quench the effluent smoke therein, and means in said conduit to agglomerate the carbon black particles in said smoke comprising a plurality of conical enlarged portions in said conduit, said enlarged portions each having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke.

10. A carbon black agglomeration system comprising in combination a conduit disposed and adapted to be connected to the outlet of a carbon black furnace to receive carbon black particle containing effluent smoke therefrom, a water spray disposed and adapted to discharge into said conduit to quench the effluent smoke therein, and means in said conduit to agglomerate the carbon black particles in said smoke comprising a plurality of conical enlarged portions in said conduit, said enlarged portions each having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke.

11. A carbon black agglomeration system comprising in combination a conduit disposed and adapted to be connected to the outlet of a carbon black furnace to receive carbon black particle containing effluent smoke therefrom, and means in said conduit to agglomerate the carbon black particles in said smoke comprising a plurality of conical enlarged portions in said conduit, said enlarged portions each having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke.

12. A carbon black agglomeration system comprising in combination a conduit disposed and adapted to be connected to the outlet of a carbon black furnace to receive carbon black particle containing effluent smoke therefrom, and means in said conduit to agglomerate the carbon black particles in said smoke comprising a conical enlarged portion in said conduit, said enlarged portion having an inlet tangential to wall thereof and a single axial outlet, said conduit being formed to pass said smoke tangentially into the enlarged end of said conical portion to pass helically through said enlarged portion solely out the small end of said cone into a continuation of said conduit, whereby the carbon particles are thrown outwardly by centrifugal force into agglomerating contact without separation of said carbon black particles from the remainder of said smoke.

13. A carbon black agglomeration system comprising in combination a conduit disposed and adapted to be connected to the outlet of a carbon black furnace to receive carbon black particle containing effluent smoke therefrom, and means in said conduit to agglomerate the carbon black particles in said smoke comprising a plurality of enlarged portions in said conduit, said enlarged portions each having an inlet tangential to wall thereof and a single axial outlet, said conduit being formed to pass said smoke tangentially into the enlarged portion to pass helically through said enlarged portion solely into a continuation of said conduit, whereby the carbon particles are thrown outwardly by centrifugal force into agglomerating contact without separation of said carbon black particles from the remainder of said smoke.

14. A carbon black agglomeration system comprising in combination a conduit disposed and adapted to be connected to the outlet of a carbon black furnace to receive carbon black particle containing effluent smoke therefrom, and means in said conduit to agglomerate the carbon black particles in said smoke comprising an enlarged portion in said conduit, said enlarged portion having an inlet tangential to wall thereof and a single axial outlet, said conduit being formed to pass said smoke tangentially into the enlarged portion to pass helically through said enlarged portion solely into a continuation of said conduit, whereby the carbon particles are thrown outwardly by centrifugal force into agglomerating contact without separation of said carbon black particles from the remainder of said smoke.

15. The process of agglomerating carbon black particles in a stream of effluent smoke coming from a carbon black producing furnace, comprising the steps of passing said effluent smoke tangentially into a first zone of enlarged cross sectional area thereby impinging by centrifugal force some of said particles against others, reducing the diameter of said stream by passing all of said smoke out of said zone through a single axial outlet of diameter less than said enlarged cross sectional area, and repeating said steps, whereby said carbon black particles are agglomerated without separating the same from any of the gaseous portion of said smoke and thereby avoiding creating a more dilute smoke from which the carbon black is more difficult to separate.

16. The process of agglomerating carbon black particles in a stream of effluent smoke coming from a carbon producing furnace, comprising the steps of passing said effluent smoke tangentially into a first zone of enlarged cross sectional area thereby impinging by centrifugal force some of said particles against others, and reducing the diameter of said stream by passing all of said smoke out of said zone through a single axial outlet of diameter less than said enlarged cross sectional area, whereby said carbon black particles are agglomerated without separating the same from any of the gaseous portion of said smoke and thereby avoiding creating a more dilute smoke from which the carbon black is more difficult to separate.

References Cited in the file of this patent

UNITED STATES PATENTS

| | | |
|---|---|---|
| 2,139,585 | Hunter | Dec. 6, 1938 |
| 2,292,355 | Ayers | Aug. 11, 1942 |
| 2,311,154 | Carney | Feb. 16, 1943 |
| 2,457,962 | Whaley | Jan. 4, 1949 |
| 2,548,332 | Alexander et al. | Apr. 10, 1951 |